US005505549A

United States Patent [19]
Ishiguro

[11] Patent Number: 5,505,549
[45] Date of Patent: Apr. 9, 1996

[54] CHARACTER RESOURCE UTILIZING SYSTEM

[75] Inventor: Keiji Ishiguro, Kawasaki, Japan

[73] Assignee: Fujitsu Limited, Kawasaki, Japan

[21] Appl. No.: 213,515

[22] Filed: Mar. 16, 1994

[30] Foreign Application Priority Data

Mar. 31, 1993 [JP] Japan ................................. 5-098571

[51] Int. Cl.$^6$ ............................................. B41J 3/00
[52] U.S. Cl. ...................... 400/61; 400/109; 364/464.01
[58] Field of Search ................................. 400/61, 76, 93, 400/109, 110, 70; 364/464.04, 464.01; 395/104, 108, 110, 114, 150

[56] References Cited

FOREIGN PATENT DOCUMENTS

| 2-67162 | 3/1990 | Japan | 400/719 |
| 4-60761 | 2/1992 | Japan | 400/719 |

*Primary Examiner*—Ren Yan
*Assistant Examiner*—Steven S. Kelley
*Attorney, Agent, or Firm*—Staas & Halsey

[57] ABSTRACT

A character resource utilizing system for preparing print data from an extracted character resource and printing characters. The character resource utilizing system includes a memory for storing a first type of character resources and a second type of character resources, a print data processing unit for reading a desired character resource from the memory and preparing print data, a printing mechanism for printing the print data, and a processing unit for performing a charging process in accordance with the use of the second type of character resources read from the memory. Another character resource utilizing system comprises a character resource managing apparatus for storing at least a second type of character resources and transferring the second type of character resources in response to a character resource request, and a printing apparatus including the aforementioned memory, print data processing unit, printing mechanism and processing unit. This design will permit other character resources than standard character resources to be properly evaluated, thereby contributing to the promotion of the development of character resources.

21 Claims, 11 Drawing Sheets

| PARAMETER NAME | EXAMPLE OF VALUES |
|---|---|
| NAME OF USED PRINTER | X X X X |
| CHARACTER RESOURCE NAME | Y Y Y Y |
| RESOURCE SENDING TIME | X X : Y Y : Z Z |
| AMOUNT OF RESOURCE DATA SENT | X Y Z (bytes) |

FIG. 8B

| PARAMETER NAME | EXAMPLE OF VALUES |
|---|---|
| NAME OF RESOURCE SUPPLYING APPARATUS | A A A A |
| CHARACTER RESOURCE NAME | Y Y Y Y |
| RESOURCE RELEASE TIME | X X : Y Y : K K |
| AMOUNT OF RESOURCE USED | A B C (characters) |

FIG. 8C

| PARAMETER NAME | EXAMPLE OF VALUES |
|---|---|
| NAME OF USED PRINTER | A A A A |
| CHARACTER RESOURCE NAME | Y Y Y Y |
| CHARGE AMOUNT | S S S S |

CHARACTER RESOURCE UTILIZING SYSTEM

BACKGROUND OF THE INVENTION

1. Field of the Invention

The present invention relates to a character resource utilizing system which permits a printing apparatus to print a document, an image, etc. using character resources such as character typefaces.

2. Description of the Related Art

Various types of printing apparatuses are widely used to print out a document. Of those printing apparatuses, a page printer, which has an electrophotographing mechanism using a photosensitive drum, is popular due to its fast printing and clear printout. This electrophotographic printer forms an electrostatic latent image on a photosensitive drum or the like, and develops the latent image with a powdery developer to provide a visible image. After the developed image is transferred onto a sheet of paper, the sheet is separated from the photosensitive drum and the transferred image is then fixed. Such a printing apparatus basically performs dots-based printing. This printing apparatus can therefore print out any pattern as long as the pattern is expressed in dots. Because of the feature, the printing apparatus is capable of printing various types of characters. Thus, there is a demand for a system which can use various kinds of characters to print out a pattern.

Figure 1:
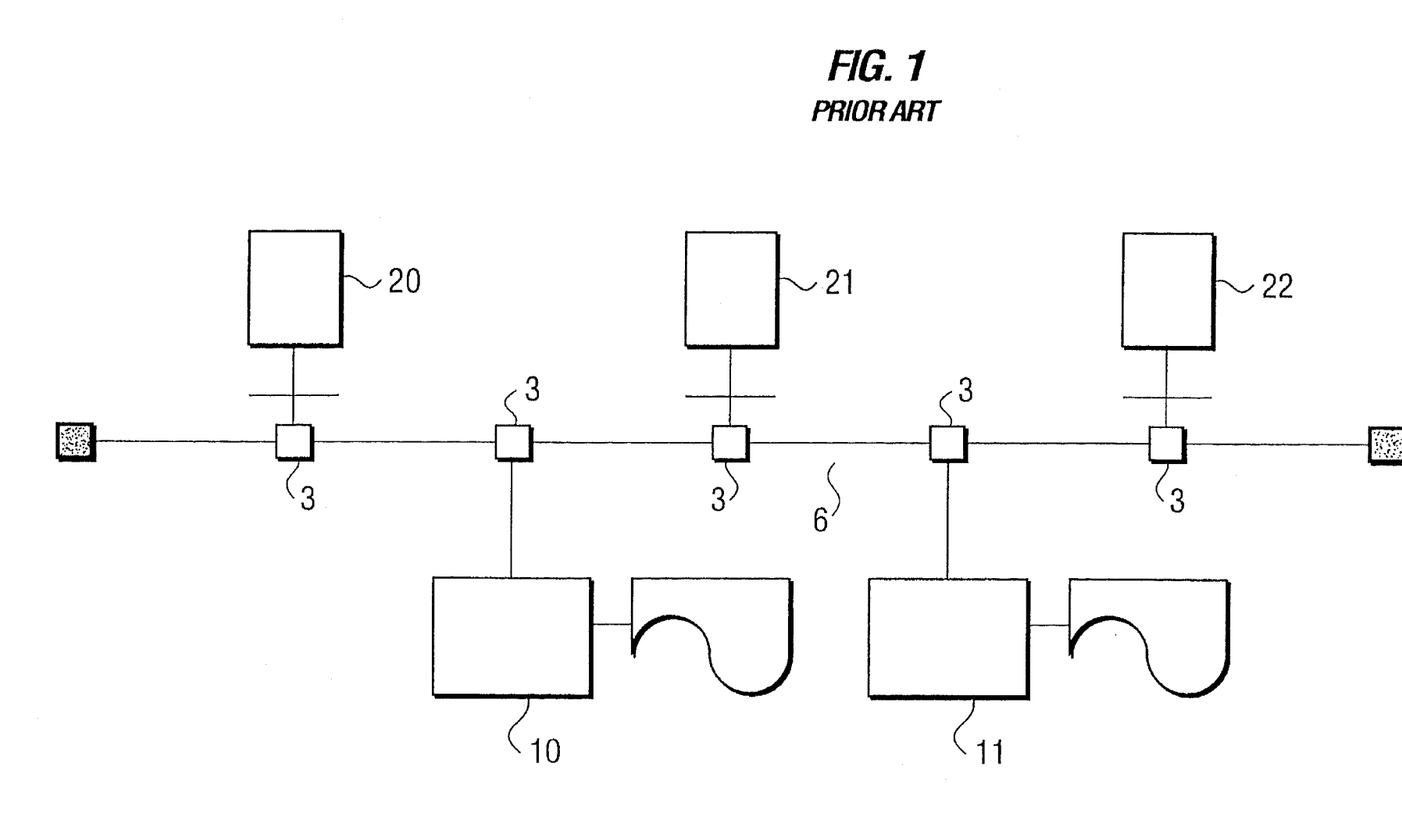
FIG. 1 is an exemplary diagram of prior art.

FIG. 1 is an exemplary diagram of prior art.

The system shown in FIG. 1 has a plurality of terminal devices of 20 to 22, such as a personal computer, a word processor and a work station, connected via network units 3 to printing apparatuses 10 and 11 in a network 6 like a LAN (Local Area Network). The printing apparatuses 10 and 11 are used as common output apparatuses for the individual terminal devices 20–22.

In the illustrated system, the individual terminal devices 20 to 22 use the common output apparatuses 10 and 11 to print out documents. The common output apparatuses 10 and 11 have character resources (character patterns) to print out characters. The character resources include standard Mincho Kanji characters, Gothic Kanji characters, etc. which are normally used. The character resources are prepared manually as well as by software, requiring many steps. In this respect, the character resources, like software, have values according to their usages.

There is a known concept of charging and managing the number of printouts by counting and charging the amount of standard character resources used (e.g., Japanese Unexamined Patent Publication No. sho 63-218454). But, this concept is for managing the number of printouts, not for evaluating the values of character resources.

With regard to characters, such as Kanji characters, recently, there is a demand of printing those characters in various typefaces. These typefaces include a text typeface, a round typeface, a brush typeface and special typefaces besides the aforementioned standard typefaces. Those typefaces are selectively used in accordance with the type of a document. To use such optional character resources, it is necessary to purchase a font memory device or the like to store the character resources.

Unlike the standard character resources, however, the optional character resources are to be installed as desired by a purchaser. While the development of optional character resources is costly, they are generally treated as accessories and are not properly evaluated, so that the development cost cannot be recovered.

Those optional character resources are designed for beautiful display of characters, or are special characters. Therefore, the development of optional character resources costs more than that of standard characters. If the optional character resources are treated as accessories or are available at low prices, the development cost cannot be recovered. That is, the optional character resources are not properly evaluated so that it is inevitable to develop the optional character resources at a low cost and a variety of character resources cannot be provided.

SUMMARY OF THE INVENTION

It is therefore a primary object of the present invention to provide a character resource utilizing system which will permit other character resources than standard character resources to receive the proper evaluation, thereby contributing to the promotion of the development of those character resources.

It is another object of the present invention to provide a character resource utilizing system which will permit other character resources than standard character resources to be properly evaluated, thereby providing a variety of character resources.

To achieve the foregoing objects, according to one aspect of this invention, there is provided a character resource utilizing system for preparing print data from an extracted character resource and printing characters, which system comprises storage means for storing a first type of character resources and a second type of character resources; print data processing means for reading a desired character resource from the storage means and preparing print data; a printing mechanism for printing the print data; and processing means for performing a charging process in accordance with a use of the second type of character resources read from the storage means.

According to another aspect of the present invention, there is provided a character resource utilizing system for preparing print data from an extracted character resource and printing characters, which system comprises a character resource managing apparatus for storing at least a second type of character resources and transferring the second type of character resources in response to a character resource request; and a printing apparatus including storage means for storing a first type of character resources and the second type of character resources, print data processing means for reading a necessary character resource from the storage means and preparing print data, a printing mechanism for printing the print data, and processing means for receiving the second type of a character resource from the character resource managing apparatus, storing the received second type character resource in the storage means, and performing a charging process in accordance with a use of the second type character resource read from the storage means.

According to the present invention, a first type of standard character resources are treated separately from a second type of non-standard character resources. More specifically, while the first type of standard character resources are used freely, a charging process is executed for the use of the second type of non-standard character resources. As the use of the second type of character resources, such as optional character resources, is charged, such special character resources will be evaluated properly. This design will contribute to the promotion of the development of such special character resources and will provide a variety of character resources. Since standard character resources can be used freely without being charged, thus preventing an unnecessary charge on the use of those character resources.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE PREFERRED EMBODIMENTS

Figure 2:
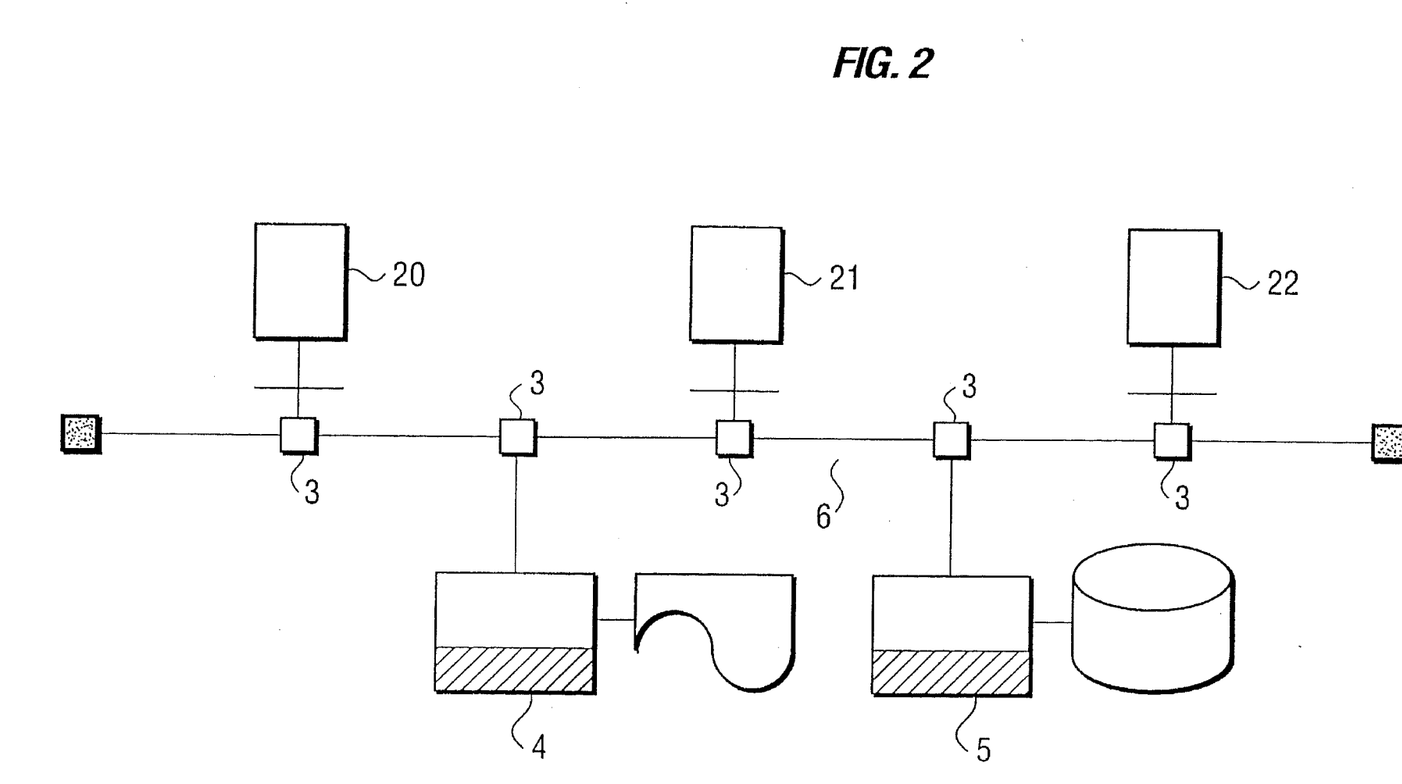
FIG. 2 is a structural diagram of one embodiment of the present invention.
Figure 3:
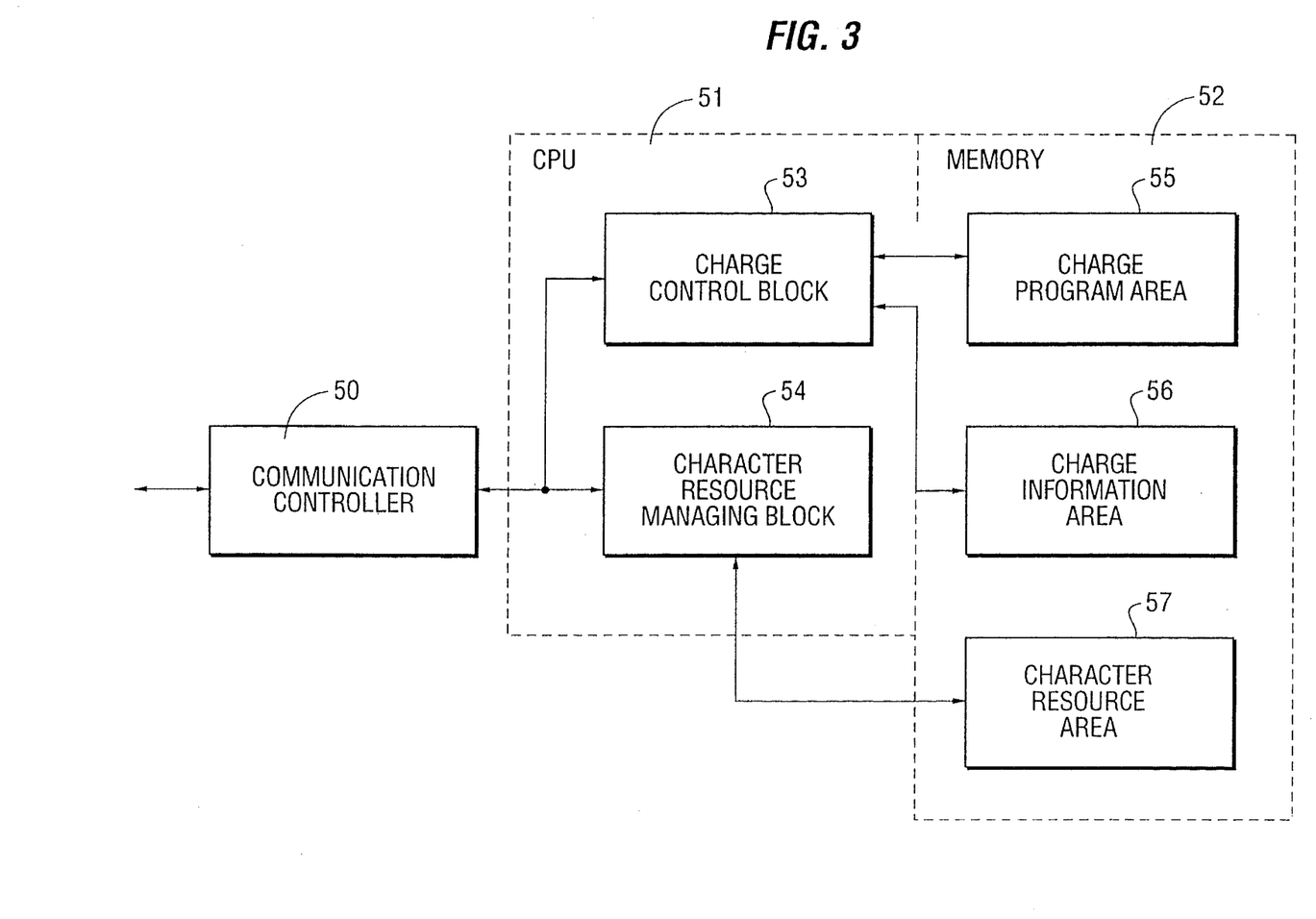
FIG. 3 is a block diagram of a character resource managing apparatus in FIG. 2.
Figure 4:
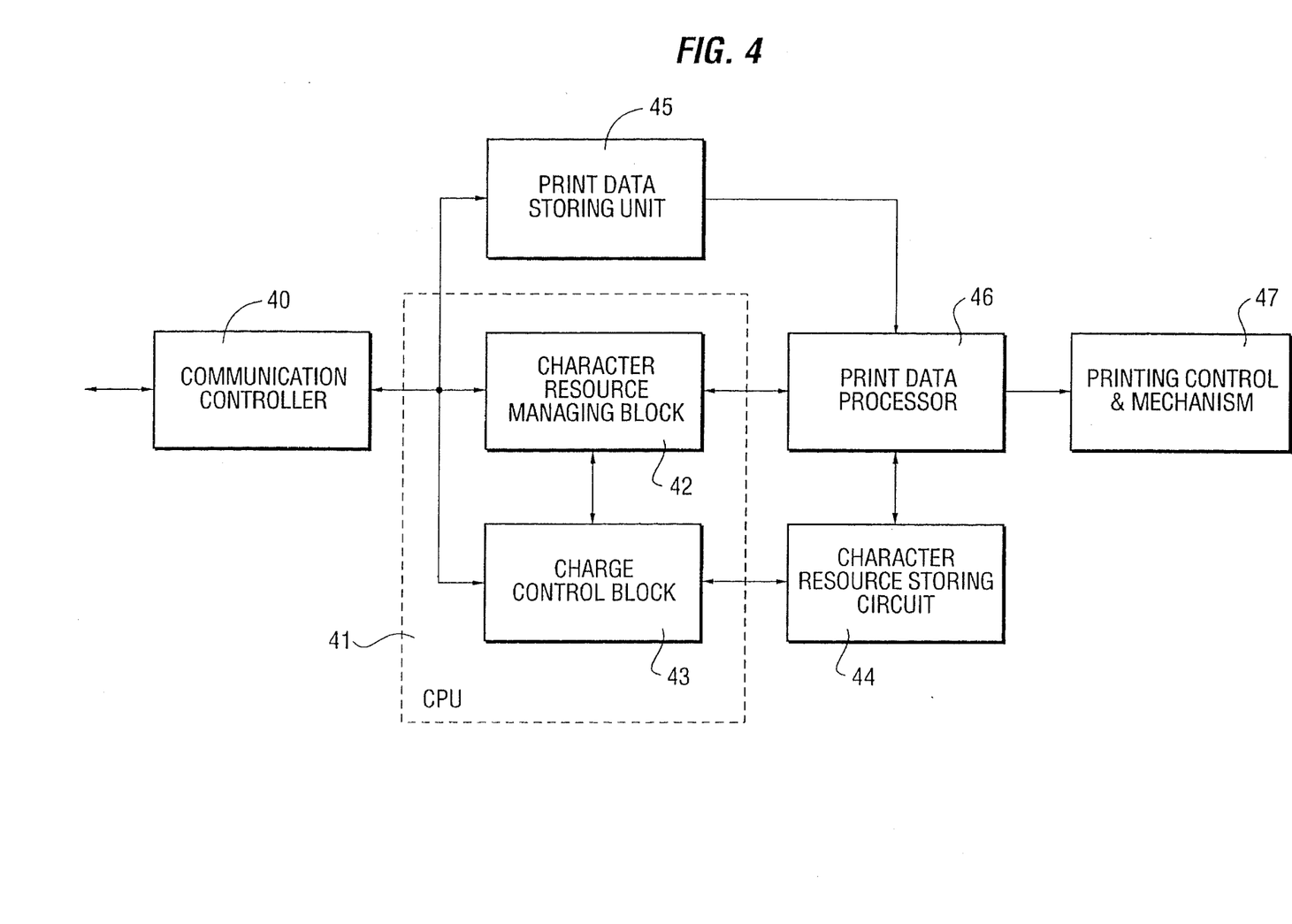
FIG. 4 is a block diagram of a common output apparatus in FIG. 2.

FIG. 2 is a structural diagram of one embodiment of the present invention, FIG. 3 is a block diagram of a character resource managing apparatus in FIG. 2, and FIG. 4 is a block diagram of a common output apparatus in FIG. 2.

In FIG. 2, a plurality of terminal devices 20 to 22, a common output apparatus 4 and a character resource managing apparatus 5 are connected to a network 6 via network units 3. This character resource managing apparatus 5 includes a file server which executes the general file management of the network. The common output apparatus 4 is a high-speed electrophotographic printer.

The structure of the character resource managing apparatus 5 will be described with reference to FIG. 3. A communication controller 50 analyzes a data communication protocol of a local area network (LAN) or the like. A CPU (Central Processing Unit) 51 serves as a file server. Further, the CPU 51 includes, as functional blocks, a charge control block 53 for selecting a charge program that matches with each common output apparatus 4, controlling a loading process and managing charge information, and a character resource managing block 54 for loading character resources in accordance with a request from the common output apparatus 4.

A memory 52 has a charge program area 55 for storing a charge program, a charge information area 56 for storing charge information, and a character resource area 57 for storing character resources. Stored in the character resource area 57 are non-standard characters, such as a text typeface, a brush typeface, round characters and special characters like a company mark, in a bit map form or in an outline form.

The structure of the common output apparatus 4 will now be described referring to FIG. 4. A communication controller 40 analyzes a data communication protocol of a LAN or the like. A CPU 41 performs various printing processes of the printing apparatus 4. Further, the CPU 41 includes, as function blocks, a character resource managing block 42 for requesting the character resource managing apparatus 5 of a character resource when a request for a necessary resource is made by a print data processor 46, and a charge control block 43, which loads a charge program from the character resource managing apparatus 5 and permits access to the character resources in the common output apparatus 4. The charge control block 43 has functions to perform a charge process on the amount of usage of a second type or non-standard character resource and transmit information of the charge to the character resource managing apparatus 5.

A character resource storing circuit 44 includes a memory for storing character resources. Standard character resources, such as character pattern information of standard typefaces like Mincho Kanji characters and Gothic Kanji characters, are stored in advance in the character resource storing circuit 44 in a bit pattern form or an outline form. A print data storing unit 45 is a buffer memory for temporarily storing print data in input data from the communication controller 40. A print data processor 46 includes a CPU, which accesses the character resources in the character resource storing circuit 44 based on the print data from the print data storing unit 45. This print data processor 46 converts the print data into a character pattern or a graphics pattern, yielding raster data that matches with the format of a printing mechanism.

Reference numeral "47" denotes a printing mechanism controller and printing mechanism, which receive raster data from the print data processor 46 and print the data on a printing medium. The printing mechanism may be a laser printer.

Figure 5:
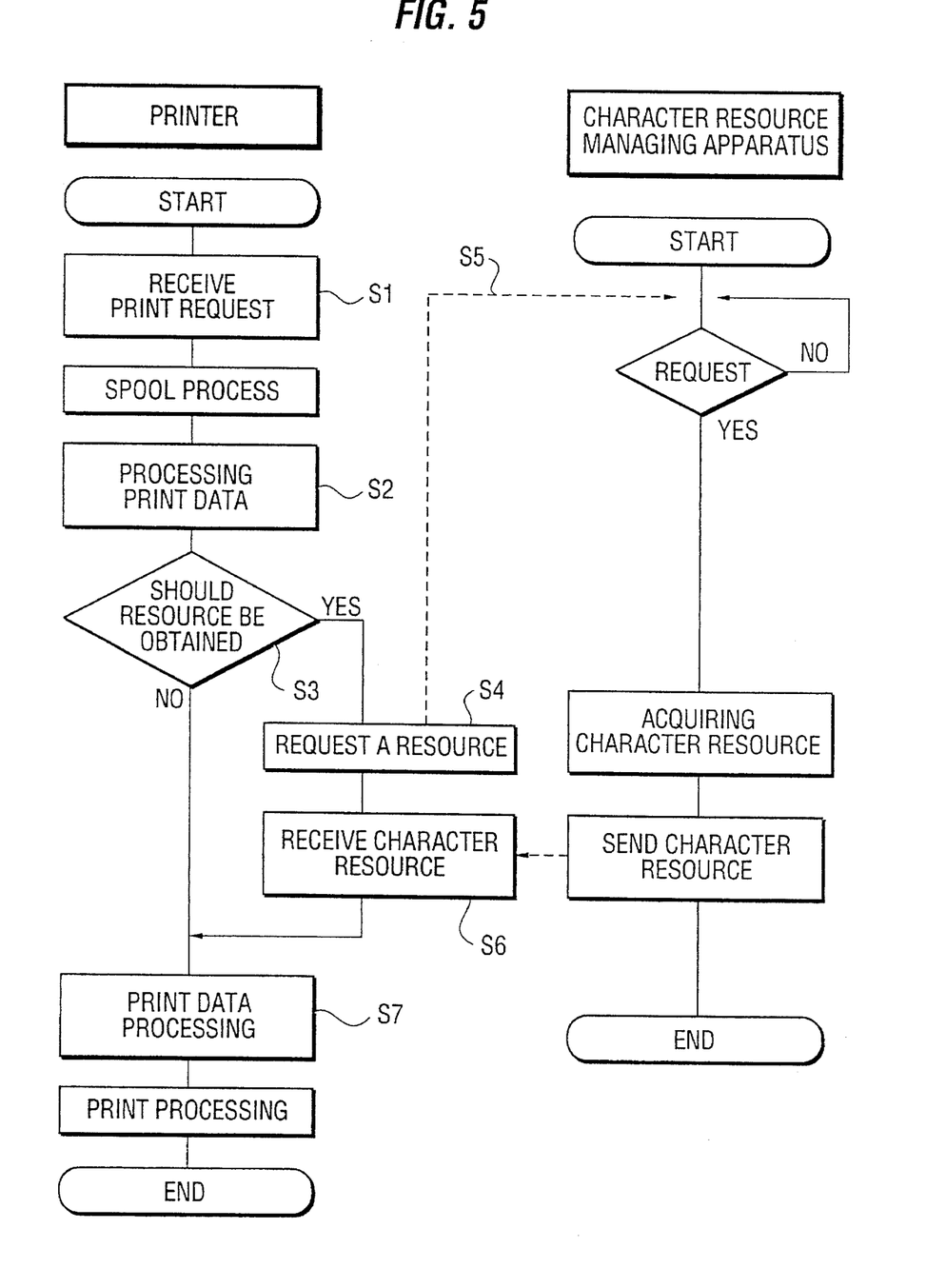
FIG. 5 is a flowchart for a process in normal mode.
Figure 6:
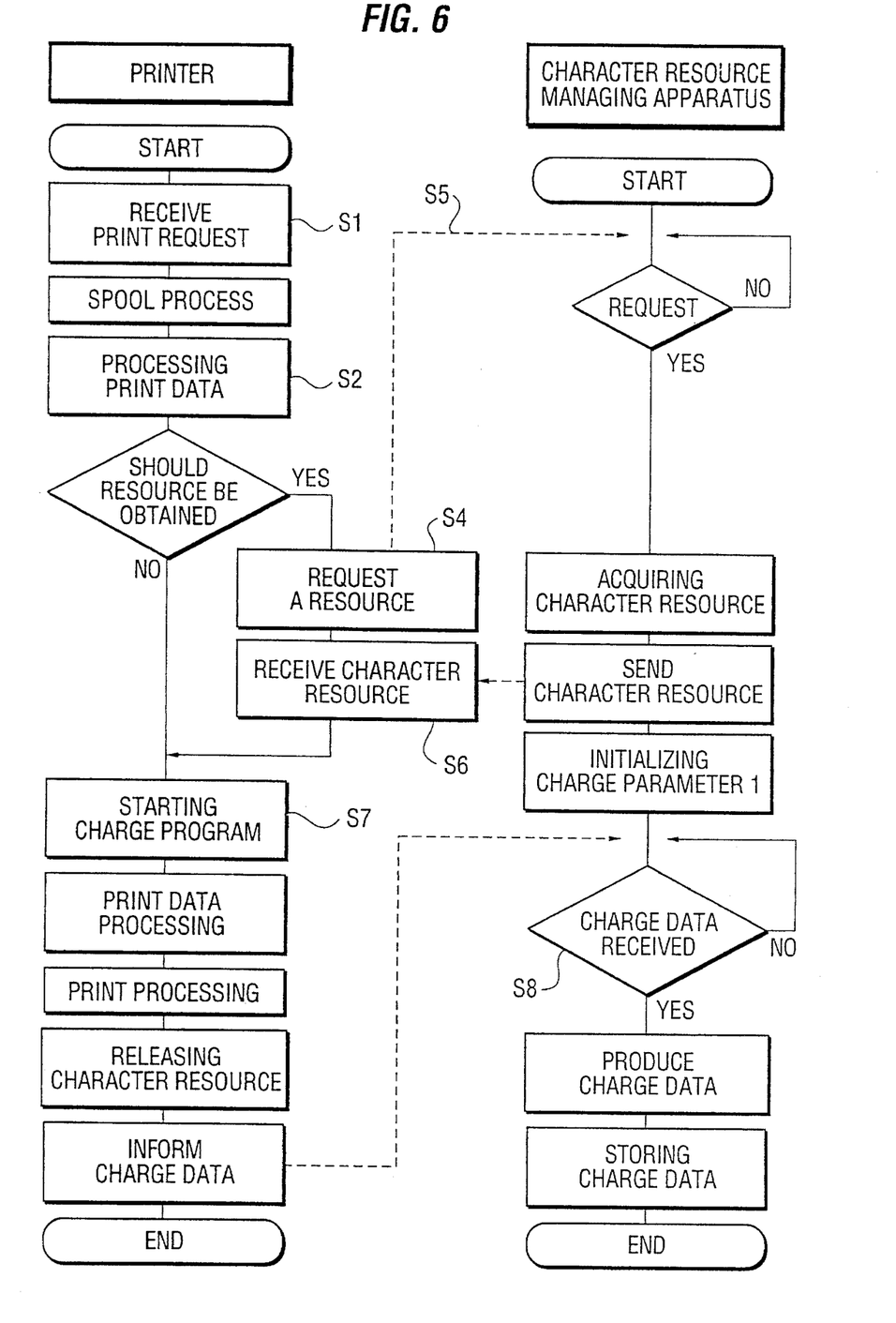
FIG. 6 is a flowchart for a process in charge mode.
Figure 7:
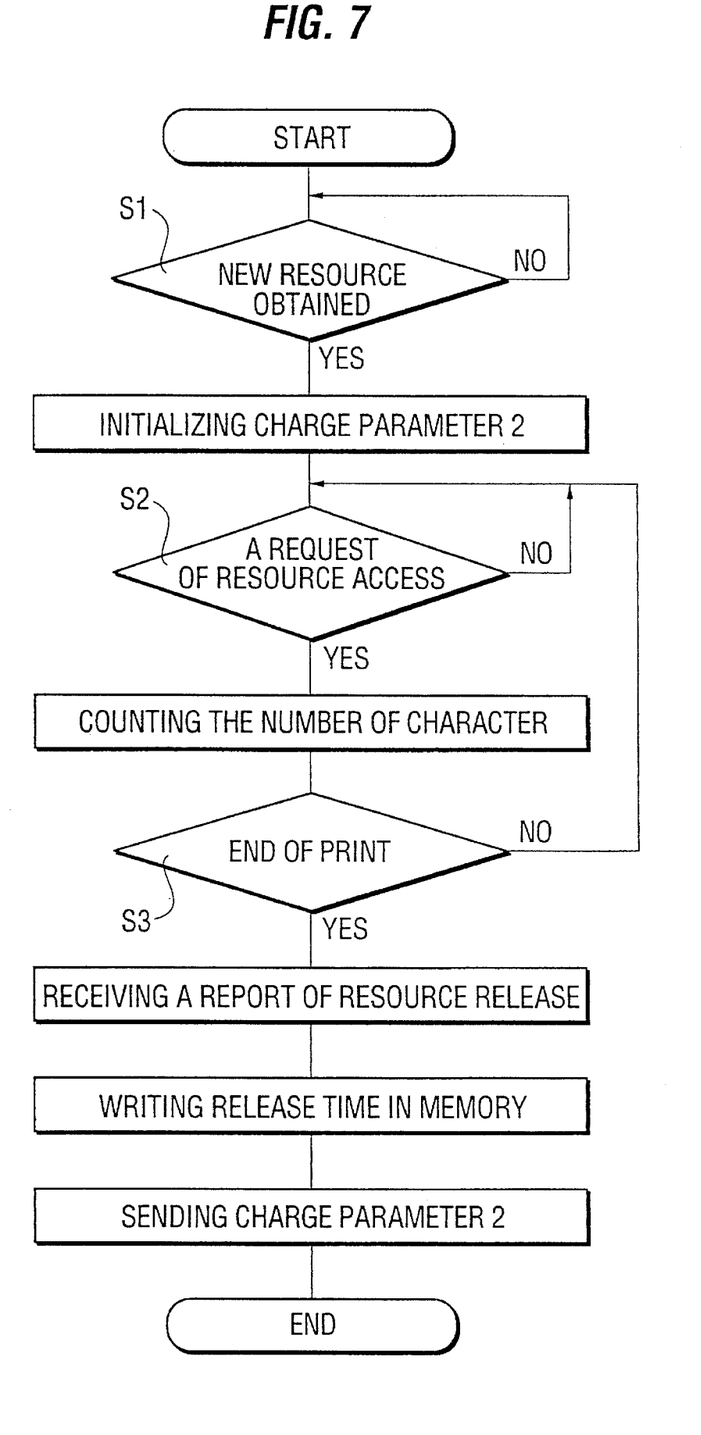
FIG. 7 is a flowchart of a charge program in FIG. 6.
Figure 8A:
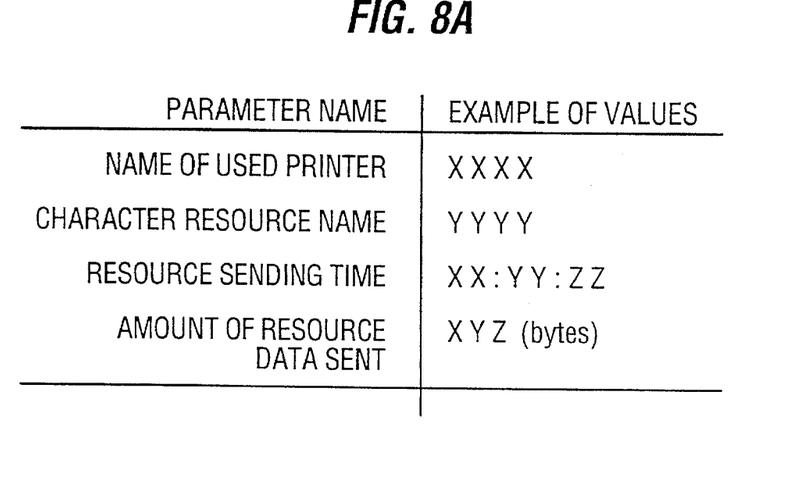
FIGS. 8A, 8B and 8C are exemplary diagrams of charge information in FIGS. 6 and 7.
Figure 8B:
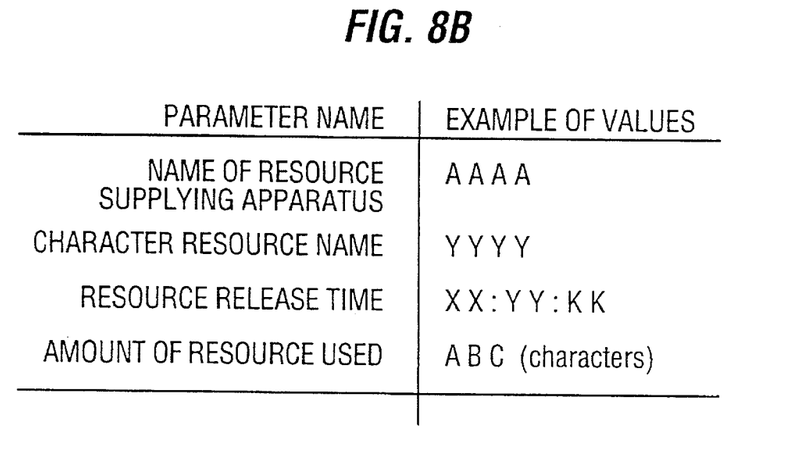
Figure 8C:
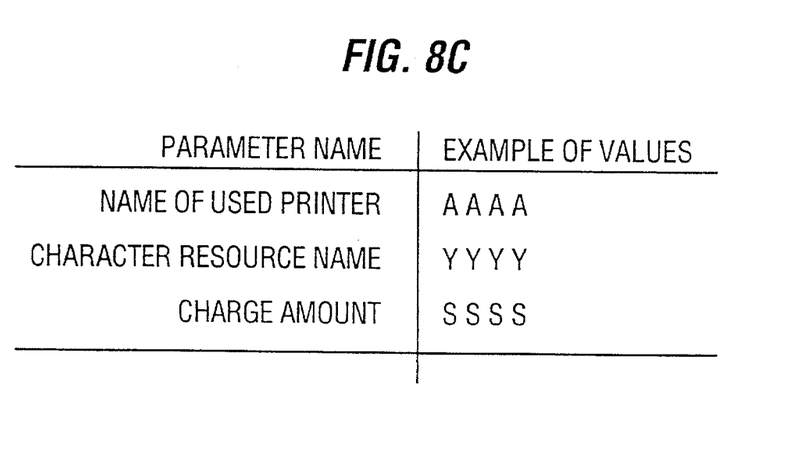

A process for utilizing character resources will now be described. FIG. 5 presents a flowchart for a process in normal mode, FIG. 6 presents a flowchart for a process in charge mode, and FIG. 7 presents a flowchart of a charge program in FIG. 6. FIGS. 8A, 8B and 8C are exemplary diagrams of charge information.

Referring to FIG. 5, the normal mode (non-charging mode) will be described first.

(S1) A print request from any of the terminal devices 20 to 22 is received by the communication controller 40 in the common output apparatus 4. Print data from the requesting terminal device 20, 21 or 22 is temporarily stored in the print data storing unit 45. This is called a spool process. The purpose of the spool process is to quicken the access speed to the common output apparatus 4 by temporarily storing print data in a secondary memory device to avoid a direct printing process.

(S2) Then, the print data processor 46 reads data to be printed from the print data storing circuit 45, and accesses the character resource storing circuit 44 to obtain an associated character resource (including a figure). This character resource is character pattern information (bit patter or outline information) corresponding to the print data. The print data processor 46 then performs a print data process to convert the character resource to raster data.

(S3) At this time, the print data processor 46 determines whether or not a necessary character resource is present in the character resource storing circuit 44. When no necessary character resource is found there, the print data processor 46 requests the character resource managing block 42 of the CPU 41 to acquire the character resource.

(S4) The character resource managing block 42 of the CPU 41 issues a resource request to the character resource managing apparatus 5 via the communication controller 40.

(S5) The character resource managing apparatus 5 monitors a character resource request by means of the communication controller 50. When there is a character resource request, the character resource managing block 54 of the CPU 51 acquires a necessary character resource from the character resource area 57 of the memory 52 and sends it to the common output apparatus 4.

(S6) The common output apparatus 4 receives the character resource via the communication controller 40, and stores it in the character resource storing circuit (S7) Then, the character resource managing block 42 of the CPU 41 informs the print data processor 46 of the storage of the character resource. Consequently, the print data processor 46 resumes the print data process. The raster data thus generated is sent to the printing mechanism controller and printing mechanism 47, and the print mechanism executes a printing process to print the print data on a printing medium under the control of the printing mechanism controller.

In normal mode, as described above, a character resource, if present in the printing apparatus 4, is used directly, while with regard to a character resource which the printing apparatus 4 does not have, the printing apparatus 4 issues a character resource request to the character resource managing apparatus 5 to obtain the character resource therefrom, loads the character resource into its own storage section and continues the printing process.

The charge mode will be discussed below referring to FIGS. 6 through 8.

(S1) A print request from any of the terminal devices 20 to 22 is received by the communication controller 40 in the common output apparatus 4. The print data from the requesting terminal device 20, 21 or 22 is temporarily stored in the print data storing circuit 45 by a spool process.

(S2) Then, the print data processor 46 reads data to be printed from the print data storing circuit 45, and accesses the character resource storing circuit 44 to obtain an associated character resource (including a figure). This character resource is character pattern information (bit patter or outline information) corresponding to the print data. The print data processor 46 then performs a print data process to convert the character resource to raster data.

(S3) At this time the print data processor 46 determines whether or not a necessary character resource is present in the character resource storing circuit 44. When no necessary character resource is found there, the print data processor 46 requests the character resource managing block 42 of the CPU 41 to acquire the character resource.

(S4) The character resource managing block 42 of the CPU 41 issues a resource request to the character resource managing apparatus 5 via the communication controller 40.

(S5) The character resource managing apparatus 5 monitors a character resource request by means of the communication controller 50. When there is a character resource request, the character resource managing block 54 of the CPU 51 acquires a necessary character resource from the character resource area 57 of the memory 52 and sends it to the common output apparatus 4. At the same time, the charge control block 53 of the CPU 51 is activated to initialize charge parameters 1. The charge parameters 1 are the name of a printing apparatus in use, the name of a character resource, the time for sending a character resource, and the amount of resource data sent as shown in FIG. 8A.

(S6) The common output apparatus 4 receives the character resource via the communication controller 40, and stores it in the character resource storing circuit 44.

(S7) Then, the charge control block 43 as the charge program functions to initialize charge parameters 2. As shown in FIG. 8B, the charge parameters 2 are the name of the apparatus which provides the character resource, the name of the character resource, the time for releasing the character resource and the amount of the character resource used. The execution of this charge program will be described later with reference to FIG. 7.

Next, the character resource managing block 42 of the CPU 41 informs the print data processor 46 of the storage of the character resource. Consequently, the print data processor 46 resumes the print data process. The raster data thus generated is sent to the printing mechanism controller and printing mechanism 47, and the print mechanism executes a printing process to print the print data on a printing medium under the control of the printing mechanism controller. At this time, the print data processor 46 access the character resource in the character resource storing circuit 44 via the charge control block 43 (charge program). After the printing operation is terminated, the charge control block 43 releases (erases) the character resource loaded into the character resource storing circuit 44, sends the charge parameters 2 to the character resource managing apparatus 5 and then terminates the printing.

(S8) The character resource managing apparatus 5 is ready to receive charge information (charge parameters 2). Upon reception of the charge information, the charge control block 53 of the CPU 51 produces charge information from the charge parameters 1 shown in FIG. 8A and the charge parameters 2 sent from the common output apparatus 4. This charge information includes the name of the printing apparatus used, the name of the character resource and the charge amount. The charge amount is computed from the following equation.

charge amount=amount of usage×&A1+data amount×&A2+storage time×&A3 where &A1, &A2 and &A3 are the charging factors.

The charge information is stored in the charge information area 56 in the memory 52, thus completing this process for the charge mode.

Referring now to FIG. 7, the charge program will be described.

(S1) When a new character resource is obtained in the common output apparatus 4, this charge program is invoked. First, the charge parameters 2 are initialized. That is, the name of the apparatus which provides the character resource, the name of the character resource, the time for releasing the character resource and the amount of the character resource used as shown in FIG. 8B are initialized and stored in the memory.

(S2) Then, it is determined if there is a request to access this resource from the print data processor 46. If there is such an access request, the number of characters that are requested to be accessed is counted to update the amount of the resource usage in the memory.

(S3) It is then determined if the printing process is complete. If the printing process is not complete, the flow returns to step 32. If the printing process is finished, the charge control block 43 receives a report that the resource has been released, from the character resource managing block 42, and writes the release time in the memory where the charge parameters 2 are stored. Further, thus updated charge parameters 2 (FIG. 8B) are sent to the character resource managing apparatus 5, and this execution of this charge program is complete.

As is apparent from the above, in charge mode too, a character resource, if present in the printing apparatus 4, is used directly, while with regard to a character resource which the printing apparatus 4 does not have, the printing apparatus 4 issues a character resource request to the character resource managing apparatus 5 to obtain the character resource therefrom, loads the character resource into its own storage section and continues the printing process.

At this time, the charge program is invoked in the character resource managing apparatus 5, while in the printing apparatus 4, the access to the character resource storing circuit 44 is permitted to update the charge information under the control of the charge program. Based on this charge information, the character resource managing apparatus 5 calculates charge information including the charge amount.

A character resource, which is not installed in the printing apparatus 4, is provided by the character resource managing apparatus 5 and a charge for providing the character resource is made accordingly. This system allows character resources to be properly evaluated and thus contributes to the promotion of the development of character resources. Further, this system will permit multifarious character resources to be available, thereby ensuring the printing of characters according to the contents of a document. Furthermore, this system will encourage business activities, such as a rental service for character resources.

As a file server is used as the character resource managing apparatus 5 in this embodiment, character resources can be stored using a part of the common file in the network. This advantageously eliminates the need for providing a separate file for storing many types of characters, particularly, Kanji characters.

Since the character resource managing apparatus 5 for storing the second type of character resources is provided separate from the printing apparatus 4 and this apparatus 5 transfers a necessary character resource of the second type to the printing apparatus 4 when requested by the printing apparatus 4, the second type of multifarious character resources can be managed specifically. This design allows the second type of character resources to be shared by a plurality of printing apparatuses and facilitates the revision, addition and deletion of the second type of character resources. Further, this design brings about a new business opportunity to provide the second type of character resources.

The second type character resource stored in the character resource storing circuit 44 is released upon completion of the printing process, thus preventing the unauthorized use of any character resource after charging processing is terminated. As the resource storage time or the period in which the second type character resource is usable, the amount of the resource and the amount of usage thereof are used to calculate the charge amount, the proper charge on the usage of the resource can be calculated. Further, the character resource managing apparatus 5 carries out the calculation, so that an unauthorized use of character resources can be prevented and charging can be managed specifically.

As the printing apparatus 4 is connected to a plurality of terminal devices 20 to 22 in this system, it is possible to share the necessary second type of character resources for the individual terminal devices and manage those character resources specifically. As the character resource managing apparatus 5 is constituted of a server which is connected to a plurality of terminal devices 20 to 22 and provides a service to each terminal device, the character resources can be managed using the server of the network, thus allowing for the use of the conventional network structure.

Figure 9:
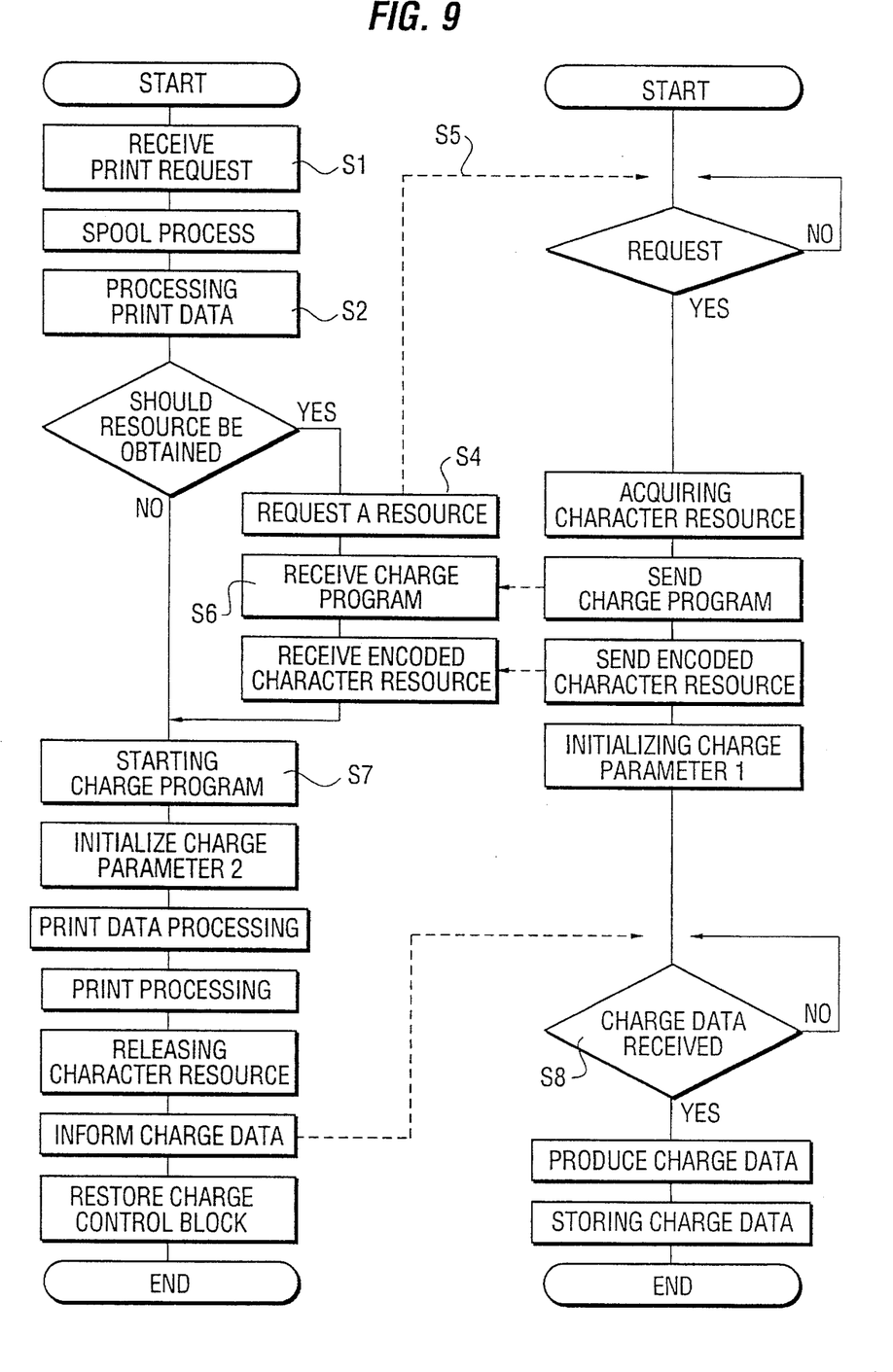
FIG. 9 is a flowchart for a process in security charge mode.
Figure 10:
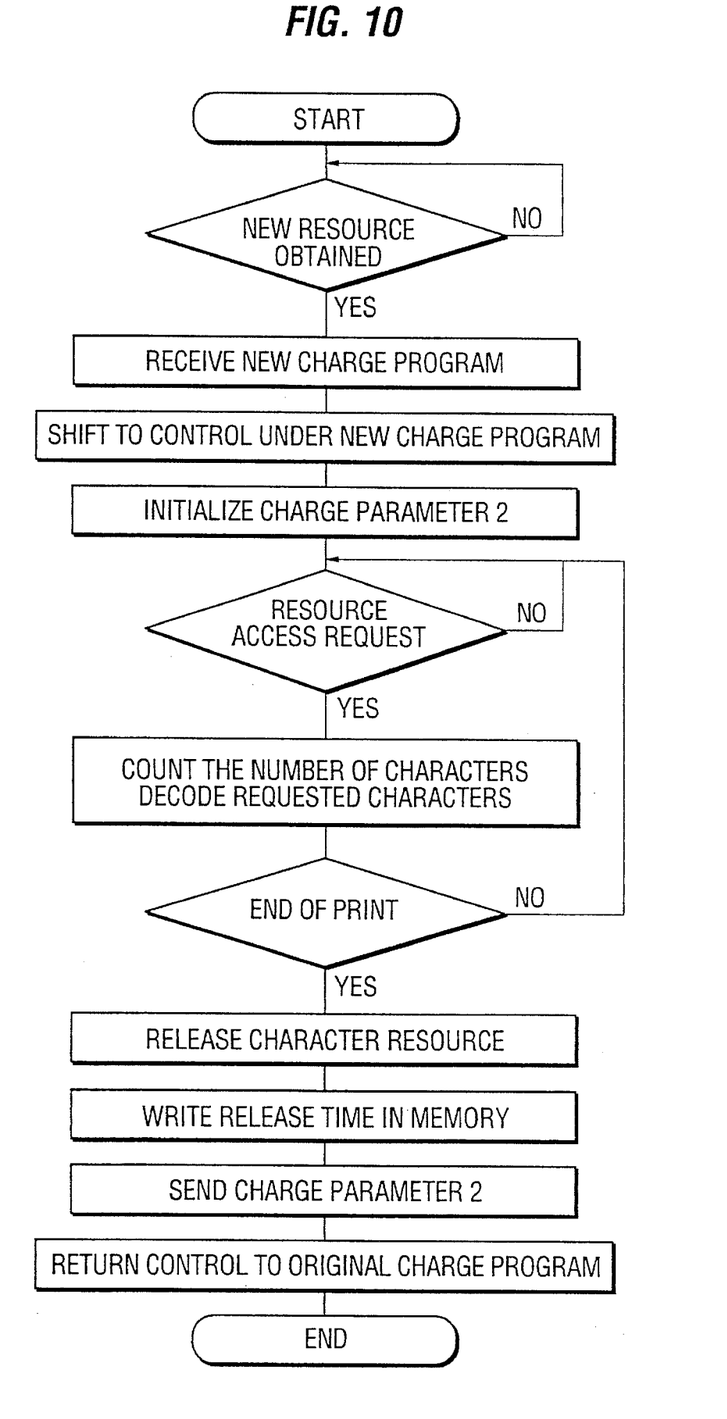
FIG. 10 is a flowchart of a charge program in FIG. 9.

FIG. 9 presents a flowchart for a process in security charge mode, as a modification of the present invention, and FIG. 10 presents a flowchart of a charge program in FIG. 9.

In this embodiment, the character resource managing apparatus 5 executes a charge mode which will avoid overlooked charging with respect to the character resource obtaining request from the common printing apparatus 4 and the amount of the character resource used. The structures of the individual components are the same as those shown in FIGS. 2 through 4.

The security charge mode will now be explained with reference to FIGS. 9 and 10.

The charge mode will be discussed below referring to FIGS. 6 through 8.

(S1) A print request from any of the terminal devices 20 to 22 is received by the communication controller 40 in the common output apparatus 4. The print data from the requesting terminal device 20, 21 or 22 is temporarily stored in the print data storing circuit 45 by a spool process.

(S2) Then, the print data processor 46 reads data to be printed from the print data storing circuit 45. The print data processor 46 then accesses the character resource storing circuit 44 based on the print data to obtain an associated character resource (including a figure). This character resource is character pattern information (bit patter or outline information) corresponding to the print data. The print data processor 46 then performs a first print data process to convert the character resource to raster data.

(S3) At this time, the print data processor 46 determines whether or not a necessary character resource is present in the character resource storing circuit 44. When no necessary character resource is found there, the print data processor 46 requests the character resource managing block 42 of the CPU 41 to acquire the character resource.

(S4) The character resource managing block 42 of the CPU 41 issues a resource request to the character resource managing apparatus 5 via the communication controller 40.

(S5) The character resource managing apparatus 5 monitors a character resource request by means of the communication controller 50. The character resources are stored in an encoded form in the character resource area 57 in the memory 52. When there is a character resource request, therefore, the character resource managing block 54 of the CPU 51 acquires a necessary encoded character resource from the character resource area 57. The charge control block 53 of the CPU 51 reads the charge program, which matches with the requesting common output apparatus 4, from the charge program area 55 in the memory 52, and sends it to the common output apparatus 4. At the same time, the charge control section 53 is activated to initialize charge parameters 1. The charge parameters 1 are the name of a printing apparatus in use, the name of a character resource, the time for sending a character resource, and the amount of resource data sent as shown in FIG. 8A.

(S6) The common output apparatus 4 receives the character resource via the communication controller 40, and replaces the charge program in the charge control block 43 in the CPU 41 with the received one. Or, the common output apparatus 4 stores the received charge program. Alternatively, the common output apparatus 4 receives an encoded character resource and stores it in the character resource storing circuit 44.

(S7) Then, the charge control block 43 as the charge program functions to initialize charge parameters 2. The charge parameters 2 are the same as shown in FIG. 8B: the name of the apparatus which provides the character resource, the name of the character resource, the time for releasing the character resource and the amount of the character resource used. The execution of this charge program will be described later with reference to FIG. 10.

Next, the character resource managing block 42 informs the print data processor 46 of the storage of the character resource. Consequently, the print data processor 46 resumes the print data process. The raster data thus generated is sent to the printing mechanism controller and printing mechanism 47, and the print mechanism executes a printing process to print the print data on a printing medium under the control of the printing mechanism controller.

At this time, the print data processor 46 access the character resource in the character resource storing circuit 44 via the charge control block 43 (charge program). After the printing operation is terminated, the charge control block 43 releases (erases) the character resource loaded into the character resource storing circuit 44, sends the charge parameters 2 to the character resource managing apparatus 5 and then terminates the printing.

(S8) The character resource managing apparatus 5 is ready to receive charge information (charge parameters 2). Upon reception of the charge information, the charge control block 53 of the CPU 51 produces charge information from the charge parameters 1 shown in FIG. 8A and the charge parameters 2 sent from the common output apparatus 4. This charge information includes the name of the printing apparatus used, the name of the character resource and the charge amount. The charge amount is computed from the following equation.

charge amount=amount of usage×&A1+data amount×&A2+storage time×&A3 where &A1, &A2 and &A3 are the charging factors.

The charge information is stored in the charge information area 56 in the memory 52, and the charge control block 43 is restored to the original status before completing this processing.

Referring now to FIG. 10, the charge program will be described.

(S1) When a new character resource is obtained in the common output apparatus 4, this charge program is invoked. First, a new charge program is received and control is given to the new charge program. Then, the charge parameters 2 are initialized. That is, the name of the apparatus which provides the character resource, the name of the character resource, the time for releasing the character resource and the amount of the character resource used as shown in FIG. 8B are initialized and stored in the memory.

(S2) Then, it is determined if there is a request to access this resource from the print data processor 46. If there is such an access request, the number of characters that are requested to be accessed is counted to update the amount of the resource usage in the memory. At the same time, the encoded character resource is decoded.

(S3) It is then determined if the printing process is complete. If the printing process is not complete, the flow returns to step S2. If the printing process is finished, the charge control block 43 receives a report that the resource has been released, from the character resource managing block 42, and writes the release time in the memory where the charge parameters 2 are stored. Further, thus updated charge parameters 2 (FIG. 8B) are sent to the character resource managing apparatus 5. Finally, control is given to the original charge program before terminating this processing.

As is apparent from the above, in this charge mode too, a character resource, if present in the printing apparatus 4, is used directly, while with regard to a character resource which the printing apparatus 4 does not have, the printing apparatus 4 issues a character resource request to the character resource managing apparatus 5 to obtain the character resource therefrom, loads the character resource into its own storage section and continues the printing process.

At this time, the charge program is invoked in the character resource managing apparatus 5, while in the printing apparatus 4, the access to the character resource storing circuit 44 is permitted to update the charge information under the control of the charge program. Based on this charge information, the character resource managing apparatus 5 calculates charge information including the charge amount.

A character resource, which is not installed in the printing apparatus 4, is provided by the character resource managing apparatus 5 and a charge for providing the character resource is made accordingly. This system allows character resources to be properly evaluated and thus contributes to the promotion of the development of character resources. Further, this system will permit multifarious character resources to be available, thereby ensuring the printing of characters according to the contents of a document. Furthermore, this system will encourage business activities, such as a rental service for character resources.

Since the character resource managing apparatus 5 sends an encoded character resource and a charge program, which decodes the encoded character resource and performs a charging process, in this embodiment, the charging process in the printing apparatus can be controlled to prevent overlooked charging.

That is, any second type character resource will not be restored (decoded) unless a charge is made, thereby preventing overlooked charging that may otherwise be caused by an unauthorized user. Further, as the charge program is transferred whenever necessary, overlooked charging that may otherwise be caused by an unauthorized user can be prevented more properly.

Figure 11:
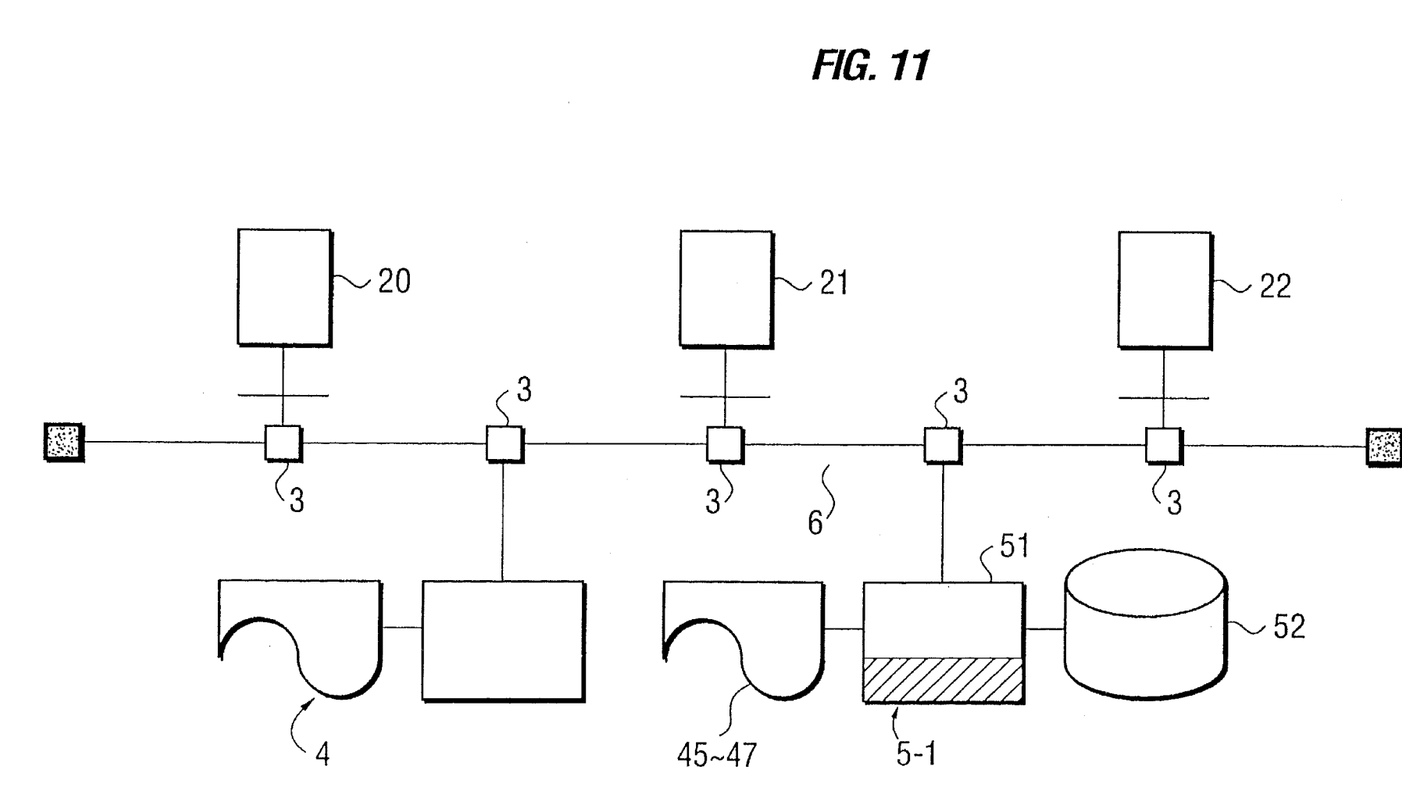
FIG. 11 is a structural diagram of another embodiment of the present invention.

FIG. 11 is a structural diagram of a system according to another embodiment of the present invention.

In this embodiment, the character resource managing apparatus 5 includes a file printer server 5-1. With the illustrated structure, the character resource managing apparatus 5-1 has the print data storing circuit 45, the print data processor 46 and the printing mechanism controller and printing mechanism 47 of the printing apparatus in addition to the communication controller 50, the CPU 51 and the memory or file device 52.

In this case standard character resources and non-standard character resources are stored in the file device 52. The CPU 51 performs a charging process for any access to any non-standard character resource (second type character resource), as per the above-described embodiments. If the common output apparatus 4 is connected to this network, the printing apparatus 4 is permitted to request the character resource managing apparatus 5-1 to acquire a necessary character resource, as per the above-described embodiments. The charging process is executed in this case too.

In addition to this embodiment, the present invention may be modified in the following manners.

The present invention is not limited to the network structure, but may be adapted for a printing apparatus which is connected merely to an upper apparatus. Further, another method may be employed to calculate the charging amount. The switching between the normal mode and the charge mode may be designed to be enabled by setting a printing apparatus. The switching between the normal mode and the security charge mode may be permitted in a similar manner. Further, the normal mode, the charge mode and the security charge mode may be allowed to be changed from one to another.

Although three embodiments of the present invention have been described herein, it should be apparent to those skilled in the art that the present invention may be embodied in many other specific forms without departing from the spirit or scope of the invention.

In short, since a charge is made on the use of other character resources than standard character resources installed according to the present invention, such special characters will be properly evaluated, thus contributing to the promotion of the development of such character resources. This system therefore will eventually provide multifarious character resources, and will bring about a new business opportunity to provide the second type of character resources.

What is claimed is:

1. A character resource utilizing system for preparing print data from an extracted character resource and printing characters, said system comprising:

a first character resource to store a set of characters in a standard typeface;

a second character resource to store said set of characters in a second typeface different from said standard typeface;

print data processing means for reading desired characters of said set of characters in said standard typeface and in said second typeface stored in said first and second character resources, respectively, and for preparing print data therefrom;

a printing mechanism for printing said print data prepared from both said first and said second character resources; and processing means for performing a charging process in accordance with a use of said desired characters in said second typeface read from said second character resource.

2. The character resource utilizing system according to claim 1, wherein said second character resource stores said set of characters in said second typeface in an encoded form, and said processing means decodes said desired characters in said second typeface in said charging process and outputs said decoded desired characters in said second typeface to said print data processing means.

3. The character resource utilizing system according to claim 2, wherein said processing means counts an amount of usage of said desired characters in said second typeface in said charging process.

4. The character resource utilizing system according to claim 1, wherein said processing means counts an amount of usage of said desired characters in said second typeface in said charging process.

5. The character resource utilizing system according to claim 1, further comprising character resource managing means for storing and transferring said set of characters in said second typeface to said print data processing means.

6. A character resource utilizing system connected to a plurality of terminal devices, said system comprising:

a character resource managing device to store a set of characters in a second typeface different from a standard typeface and to transfer said said set of characters in said second typeface in response to a character resource request; and a printing apparatus including storage means for storing said set of characters in aid standard typeface and said transferred set of characters in said second typeface, print data processing means for reading a necessary character resource from said storage means and for preparing print data therefrom, a printing mechanism for printing said print data prepared from both said standard typeface and said second typeface, and processing means for receiving said set of characters in said second typeface from said character resource managing device, for storing said received set of characters in said second typeface in said storage means, and for performing a charging process in accordance with a use of said set of characters in said second typeface read from said storage means.

7. The character resource utilizing system according to claim 6, wherein said character resource managing device transfers an encoded character resource of said set of characters in said second typeface; and said processing means of said printing apparatus decodes said encoded character resource and outputs said decoded character resource to said print data processing means under control of a charge program for said charging process.

8. The character resource utilizing system according to claim 7, wherein said character resource managing device transfers said charge program for said charging process together with said encoded character resource to a control device of said printing apparatus; and said processing means runs said charge program to perform said charging process.

9. The character resource utilizing system according to claim 6, wherein said processing means releases said set of characters in said second typeface stored in said storage means when a printing process is terminated.

10. The character resource utilizing system according to claim 9, wherein said processing means calculates a storage time of said set of characters in said second typeface and an amount of usage thereof, and then transfers data of said storage time and data of said amount of usage to said character resource managing device; and said character resource managing device calculates a charging amount based on said storage time data and said amount of usage data.

11. The character resource utilizing system according to claim 6, wherein said processing means counts an amount of usage of said set of characters in said second typeface in said charging process, and then transfers data of said counted amount of usage to said character resource managing device; and said character resource managing device calculates a charging amount based on said amount of usage data.

12. The character resource utilizing system according to claim 7, wherein said processing means releases said set of characters in said second typeface stored in said storage means when a printing process is terminated.

13. The character resource utilizing system according to claim 12, wherein said processing means calculates a storage time of said set of characters in said second typeface and an amount of usage thereof, and then transfers data of said storage time and data of said amount of usage to said character resource managing device; and said character resource managing device calculates a charging amount based on said storage time data and said amount of usage data.

14. The character resource utilizing system according to claim 7, wherein said processing means counts an amount of usage of said set of characters in said second typeface in said charging process, and then transfers data of said counted amount of usage to said character resource managing device; and said character resource managing device calculates a charging amount based on said amount of usage data.

15. The character resource utilizing system according to claim 8, wherein said processing means releases said set of characters in said second typeface stored in said storage means when a printing process is terminated.

16. The character resource utilizing system according to claim 15, wherein said processing means calculates a storage time of said set of characters in said second typeface and an amount of usage thereof, and then transfers data of said storage time and data of said amount of usage to said character resource managing device; and said character resource managing device calculates a charging amount based on said storage time data and said amount of usage data.

17. The character resource utilizing system according to claim 8, wherein said processing means counts an amount of usage of said set of characters in said second typeface in said charging process, and then transfers data of said counted amount of usage to said character resource managing device; and said character resource managing device calculates a charging amount based on said amount of usage data.

18. The character resource utilizing system according to claim 6, wherein said printing apparatus is connected to said plurality of terminal devices to be shared by said plurality of terminal devices.

19. The character resource utilizing system according to claim 18, wherein said character resource managing device is a file server connected to said plurality of terminal devices.

20. A character resource utilizing system connected to a plurality of terminal devices, said system comprising:

a first character resource to store a set of characters in a standard typeface;

a second character resource to store said set of characters in a second typeface different from said standard typeface;

first processing means for acquiring desired characters of said set of characters in said standard typeface and in said second typeface stored in said first and second character resources, respectively, in accordance with a request from one of the terminal devices and outputting the desired characters acquired from both said first and said second character resources to the one terminal device; and second processing means for counting a number of the desired characters of said set of characters in said second typeface which number has been acquired through said first processing means, and for preparing a table indicating the number acquired by the one terminal device.

21. A character resource utilizing system connected to a plurality of terminal devices, said system comprising:

a first character resource to store a set of characters in a standard typeface;

a second character resource to store said set of characters in a second typeface different from said standard typeface;

first processing means for acquiring desired characters of said set of characters in said standard typeface and in said second typeface stored in said first and second character resources, respectively, in accordance with a request from one of the terminal devices and outputting the desired characters acquired from both said first and said second character resources to the one terminal device; and second processing means for counting a number of said desired characters of said set of characters in said second typeface read from said second character resource.

* * * * *

UNITED STATES PATENT AND TRADEMARK OFFICE
CERTIFICATE OF CORRECTION

PATENT NO. : 5,505,549
DATED : April 9, 1996
INVENTOR(S) : Keiji ISHIGURO

It is certified that error appears in the above-indentified patent and that said Letters Patent is hereby corrected as shown below:

```
Column 1, line 7, delete "1.";
     Line 13, delete "2.".

Column 5, line 19, after "circuit", insert --44.--.
```

Signed and Sealed this

Eighteenth Day of June, 1996

Attest:

BRUCE LEHMAN

*Attesting Officer*     *Commissioner of Patents and Trademarks*